United States Patent [19]

Fried

[11] Patent Number: 5,930,241
[45] Date of Patent: Jul. 27, 1999

[54] CENTRALIZED RADIO CONTROL IN A MOBILE COMMUNICATION SYSTEM WHEREIN AN OPERATOR CAN SELECT EITHER THE FIXED NETWORK OR THE MOBILE TO CONTROL THE RADIO TRAFFIC THEREBETWEEN

[75] Inventor: Tomas Fried, Bromma, Sweden

[73] Assignee: Telefonaktiebolaget L M Ericsson, Sweden

[21] Appl. No.: 08/785,344

[22] Filed: Jan. 17, 1997

[51] Int. Cl.$^6$ .............................. H04Q 7/00; H04B 1/10
[52] U.S. Cl. ..................... 370/328; 455/63; 455/522; 455/466
[58] Field of Search ..................... 370/328, 252, 370/522, 331, 352, 465; 455/63, 68, 69, 522, 453, 452, 466

[56] References Cited

U.S. PATENT DOCUMENTS

| | | | |
|---|---|---|---|
| 5,420,863 | 5/1995 | Taketsugu et al. | 370/95.3 |
| 5,502,721 | 3/1996 | Pohjakallio | 370/60.1 |
| 5,533,019 | 7/1996 | Jayapalan | 370/60.1 |
| 5,533,029 | 7/1996 | Gardner | 370/94.1 |
| 5,621,723 | 4/1997 | Walton, Jr. et al. | 370/18 |
| 5,722,074 | 2/1998 | Muszynski | 455/442 |
| 5,737,706 | 4/1998 | Seazholtz et al. | 455/466 |
| 5,802,465 | 9/1998 | Hamalainen et al. | 455/403 |

FOREIGN PATENT DOCUMENTS

| | | | |
|---|---|---|---|
| 9507595 | 3/1995 | WIPO | H04Q 7/32 |
| 9516330 | 6/1995 | WIPO | H04Q 7/22 |

OTHER PUBLICATIONS

38th IEEE Vehicular Technology Conference: 'Telecommunications Freedom—Technology on the Move'; USA; Jun. 15–17, 1988; Packet Switching in Digital Cellular Systems, Ken Felix; XP002047835.

Globecom '95, IEEE Global Telecommunications Conference, Singapore, Nov. 14–16, 1995; Packet Data Service Over GSM Networks With Dynamic Stealing of Voice Channels; Giuseppe Bianchi et al.; XP000622970.

*Primary Examiner*—Douglas W. Olms
*Assistant Examiner*—David R. Vincent
*Attorney, Agent, or Firm*—Jenkens & Gilchrist, P.C.

[57] ABSTRACT

A method and apparatus are provided for assigning radio network control in a mobile communications system that offers two or more types of bearer services. The mobile network broadcasts an initial control message that orders certain mobile terminals to suspend use of their normal terminal-based radio network control decisions and to accept radio network control orders from the land mobile network. A subsequent control message can order the resumed use of normal terminal-based radio network control decisions. Consequently, the mobile network can use virtually the same control logic for all of the mobile terminals that it serves, regardless of the type bearer service being carried. As a result, radio signal interference between mobile terminals carrying the different bearer services can be minimized.

37 Claims, 3 Drawing Sheets

5,930,241

CENTRALIZED RADIO CONTROL IN A MOBILE COMMUNICATION SYSTEM WHEREIN AN OPERATOR CAN SELECT EITHER THE FIXED NETWORK OR THE MOBILE TO CONTROL THE RADIO TRAFFIC THEREBETWEEN

BACKGROUND OF THE INVENTION

1. Technical Field of the Invention

The present invention relates in general to the mobile telecommunications field and, in particular, to a method and apparatus for controlling radio network resources in a cellular communications system.

2. Description of Related Art

Generally, the use of packet switching in mobile communications systems will provide operators with a versatile platform for a large variety of data applications. In fact, communications system developers anticipate that packet switched communications will form a significant part of the future's mobile telephony traffic. Consequently, it is important to ensure that future packet switched systems will be capable of operating effectively in a wide range of communications environments. It is also important to ensure that future packet switched systems will be developed with a high degree of network design flexibility.

In existing packet switched mobile systems, control over the radio network (e.g. air interface) is exercised by control logic (e.g., software algorithms) executed in processors located in the mobile stations. In contrast, radio network control in most circuit switched mobile systems is exercised by control logic at the network, which sends dedicated control messages to specified mobile stations. The primary reason for mobile station radio network control in a packet switched system is to avoid incurring the substantial signalling load that would result from the network signalling simultaneously to a multitude of packet mode mobile stations waiting in the standby mode.

On the other hand, centralized radio network control (from the network side) provides an operator with wider, more comprehensive and efficient control over the network. As such, more sophisticated control algorithms can be employed by the network control entity, and the control data can be processed in a much more efficient manner than in decentralized networks where mobile stations exercise the radio network control.

An important advantage of centralized radio network control is that higher quality traffic connections can be made, which in turn, leads to higher network capacities. This benefit is the primary reason that centralized radio network control is used in circuit switched systems operating in the active mode. However, such a benefit currently cannot be obtained for packet switched systems operating in the ready (or active) mode, because the majority of packet switched data transfers occur during relatively short periods of time. Specifically, in contrast to circuit switched connection durations, packet data transmissions are generally too short in duration to leave adequate time for optimization adjustments in the radio network (e.g., individual handovers, power level adjustments, etc.).

If a packet switched system and circuit switched system share a frequency band in the same geographical area, growth in each system's mobile station population contributes to increased radio signal interference with the other's traffic. In such a multi-service environment, the packet switched system is typically an add-on to an existing circuit switched system having a relatively large subscriber base. Consequently, the amount of packet switched traffic being carried is relatively small compared to the circuit switched traffic. Therefore, it follows that a higher percentage of packet switched traffic than circuit switched traffic will be subject to signal interference. This interference occurs primarily because the cell borders for the packet switched traffic and the cell borders for the circuit switched traffic differ from each other due to differences between the cell selection algorithms for the two types of traffic.

In existing cellular communications systems, control over the radio network is exercised either by a network entity (or entities) or the mobile stations. In other words, no existing cellular system operator has the option of determining which of the two (network or mobiles) shall exercise overall radio network control. Specifically, the important radio network functions of cell selection and re-selection, and mobile stations' power calculations are controlled either by the network entity or the mobile stations involved. For example, in the Nordic Mobile Telephone (NMT) System, Total Access Communications System (TACS), Advanced Mobile Phone System (AMPS), Digital Advanced Mobile Phone System (D-AMPS), Global System for Mobile Communications (GSM), Personal Digital Cellular (PDC) System, and IS-95 Code Division Multiple Access (CDMA) System, one or more network entities exercise control over the radio network in the active mode, while the mobile stations exercise control over the radio network in the idle mode. On the other hand, in the Digital European Cordless Telephone (DECT) circuit switched system and the Cellular Digital Packet Data (CDPD) and Mobitex packet switched systems, the mobile stations exercise control over the radio network in both the active and idle modes. In other words, it is the mobile stations that exercise control over the radio network in the idle mode, in all of the above-named systems.

SUMMARY OF THE INVENTION

A problem encountered in the prior art systems is that the control over the radio network in the idle mode is always exercised by the mobile station. When considering the uplink transmission of a packet in a packet switched system, it would sometimes be desirable to enable the use of more advanced radio network control (such as, for example, cell re-selecting algorithms) than those traditionally available in a mobile station.

It is, therefore, an object of the present invention to provide centralized radio network control to at least a first mobile station in a mobile communications system that has at least a second mobile station that is not provided with the centralized radio network control.

It is also an object of the present invention to maximize the capacity and signal quality for all traffic in a mobile communications system that provides diverse bearer services.

It is another object of the present invention to minimize the need for upgraded mobile terminals in a mobile communications system that provides diverse bearer services.

It is yet another object of the present invention to minimize radio signal interference between packet switched and circuit switched traffic in a cellular communications system.

In accordance with the present invention, the foregoing and other objects are achieved by a method and apparatus for assigning radio network control in a mobile communications system that offers two or more types of bearer services. The mobile network broadcasts an initial control message that orders certain mobile terminals to suspend use of their normal radio network control protocols and thereafter accept radio network control decisions from the mobile network. Consequently, the mobile network can use virtually the same control logic for all of the mobile terminals that it serves, regardless of the type bearer service being carried. As a result, radio signal interference between mobile terminals carrying the different bearer services can be minimized.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–5 of the drawings, like numerals being used for like and corresponding parts of the various drawings.

Figure 1:
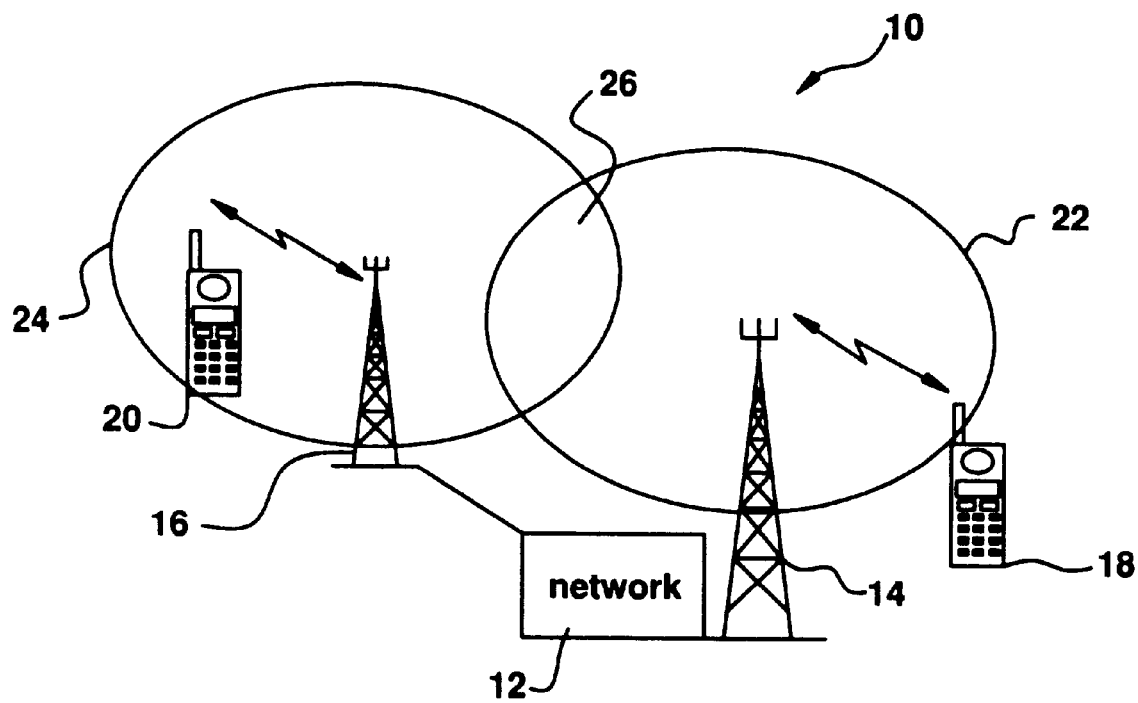
FIG. 1 is a simplified schematic drawing of a cellular communications system that carries both circuit switched traffic and packet switched traffic, in accordance with a preferred embodiment of the present invention.

FIG. 1 is a simplified schematic drawing of a cellular communications system that carries both circuit switched traffic and packet switched traffic, in accordance with a preferred embodiment of the present invention. For example, the General Packet Radio Service (GPRS) is a new packet data service that has been specified for use with the circuit switched, digital GSM. For a comprehensive overview of the GSM, refer to "The GSM System for Mobile Communications" by M. Mouly and M. B. Pautet, Cell & Sys., Copyright 1992 (ISBN: 2-9507190-0-7). The current GPRS standard is described in the GSM Technical Specification, GSM 04.60, Version 0.9.1, Sep. 26, 1996®. Notably, although the exemplary embodiment illustrated by FIG. 1 centers on a system that can carry both packet data traffic and circuit switched traffic (e.g., GPRS and GSM), the scope of the present invention is not intended to be so limited. For example, the inventive concept can be applied to any cellular communications system wherein radio network control functions are maintained and exercised by one or more network entities or by one or more populations of mobile stations.

For the exemplary embodiment illustrated by FIG. 1, system 10 includes a Public Land Mobile Network (PLMN) 12. Network 12 can include a first base station/transceiver unit 14 for, in this example, sending and receiving circuit switched traffic (e.g., GSM), and a second base station/transceiver unit 16 for, in this example, sending and receiving packet switched traffic (e.g., GPRS). For the purpose of clarity, only the base station/transceiver units 14 and 16 are shown, but it should be understood that network 12 can also include other mobile network components, such as, for example, one or more mobile services switching centers (MSCs), home location registers (HLRs), or visitor location registers (VLRs).

In this embodiment, a mobile terminal (e.g., cellular phone) 18 is coupled via an air interface to base station/transceiver unit 14. Mobile terminal 18 thereby functions to send and receive circuit switched traffic. Mobile terminal 18 can represent one or more of a plurality of circuit switched mobile terminals. A second mobile terminal 20 is coupled via an air interface to base station/transceiver unit 16. Mobile terminal 20 thereby functions to send and receive packet switched traffic. Mobile terminal 20 can represent one or more of a plurality of mobile terminals capable of handling packet switched traffic. In this example, the transmissions from base station/transceiver unit 14 define a circuit switched coverage area (e.g., cell) 22, and the transmissions from base station/transceiver unit 16 define a packet switched coverage area (or cell) 24.

As shown in FIG. 1, the circuit switched coverage area 22 overlaps the packet switched coverage area 24 at region 26. Notably, the circuit switched and packet switched traffic can share the same radio network carrier frequency bands. Consequently, mobile terminals 18 or 20 moving into or near coverage area 26 can be operating on the same set of radio network carrier frequencies, while sending and receiving their respective circuit switched or packet switched traffic.

Essentially, in accordance with the present invention, the network (12) broadcasts an initial control message (via one or more of base station/transceiver units 14 and 16), which orders the packet switched or combined circuit switched and packet switched mobile terminals 20 to suspend their normal (e.g., GPRS) cell control protocols and thereafter accept certain radio network control decisions from the network (12). When such a mobile station is switched on in an unknown geographical location and accesses the land system, it is (from a logical point of view) necessary for the mobile station to use internal algorithms for the initial selection of a base station for contact. But after this initial contact, re-selection of a cell (e.g., when the mobile station stays in the idle mode but has been moving) may be controlled from autonomous algorithms in the mobile station as accomplished in conventional systems, or by a combination of algorithms in the mobile and the network in accordance with the present invention. Consequently, the network can use the same (or virtually the same) control logic (e.g., control algorithms) for both the packet switched and circuit switched mobile terminals, which causes the packet switched traffic to behave (from a control standpoint) virtually the same as the circuit switched traffic. Therefore, in accordance with the present invention, signal interference between the packet switched and circuit switched mobile terminals can be minimized. For example, network 12 can broadcast a control message over a general broadcast channel (e.g., Packet Broadcast Control Channel or PBCCH in the GPRS) that orders all mobile terminals 20 capable of handling packet switched traffic to suspend their normal (e.g., standardized mobile internal GPRS) radio network cell re-selection and power order calculation activities, and instead use results of calculations by the network's own radio network control algorithms, in part, new algorithms overriding an existing standard, such as, for example, the GSM standard.

The precise amount of radio network control that will be relinquished by the packet switching terminals to the network (12) can vary in accordance with overall system requirements (throughput, capacity, etc.). As described above, the initial control order from the network can be broadcast universally to a population of mobile terminals (e.g., packet switching terminals) in one cell or a group of cells. The network can thereby send one of the following exemplary control orders to those mobiles, which instructs them to: (1) send signal measurement reports to the network; (2) accept specific cell identity information for the next cell re-selection (the exact timing of the handover can be determined by the individual mobiles); (3) accept cell identity information for an immediate cell re-selection (the mobiles can afterwards revert to their normal cell re-selection protocols); (4) suspend performance of their cell re-selection calculations and accept cell identity information from the network for a re-selection; (5) accept a single power level order sent from the network; or (6) suspend their own power order calculations and use power orders sent from the network.

Additionally, the network (12) can send additional control information to the (packet switched) mobile terminals in dedicated signalling messages or in packet transmissions (e.g., via a Packet Data Traffic Channel or PDTCH in the GPRS). This additional control information can include, for example, detailed information about what measurement frequencies to use, measurement reporting start and completion times, priority information, information about the identity or performance characteristics of certain cells or groups of cells, or control information that causes specific groups of mobile terminals to behave (from a control standpoint) in a specific way.

In response, each mobile station (20) can send its measurement reports to the network (12) in dedicated signalling messages or in packet transmissions (e.g., via the PDTCH in GPRS). The cell identity and power order information, which the mobiles are ordered to accept, can be sent as individual transmissions from the network to each mobile in a dedicated signalling message or packet transmission.

Figure 2:
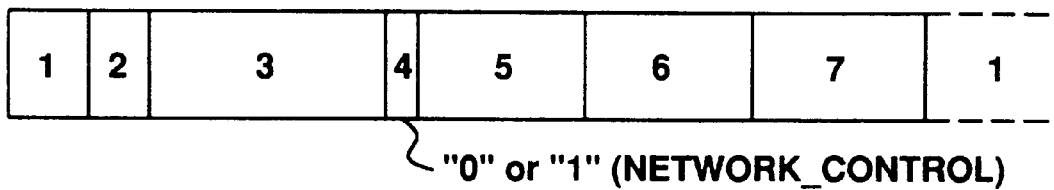
FIG. 2 is a diagram that illustrates a message format that can be used to implement the method and apparatus for controlling one or more radio networks, in accordance with the preferred embodiment of the present invention.

FIG. 2 is a diagram that illustrates a frame format that can be used to implement the method and apparatus for controlling one or more radio networks, in accordance with the preferred embodiment of the present invention. As described above, in order to initiate network control over the radio network for the packet switched mobile terminals in FIG. 1, network 12 sends a broadcast message which is received by the packet switched mobile terminals located in a cell or group of cells. For example, the broadcast message can be a system information message that includes a network control information element. Referring to FIG. 2, a radio network control information element is shown, for example, at field position 4 in an exemplary GSM system information message. Notably, although a complete control message can be broadcast to the packet switched terminals, since such a message can be quite lengthy, it is preferable to use a single bit as a control "flag" in the initial control message. This single radio network control bit can be set either to "1" or "0". In this embodiment, a "1" in bit position 4 denotes that the receiving mobiles are to listen for and decode a subsequent system information message. This subsequent information message can include additional control information. A "0" in bit position 4 denotes that the receiving mobile terminals can continue normal operations and use their own radio network control protocols.

More broadly, a "Network_Control" information item (preferably 1 bit) can be sent initially in a signalling message broadcast from the network (e.g., over a Broadcast Control Channel or BCCH). As described above, if the Network_Control bit is set to "1", then the receiving mobiles are alerted to listen for additional control instructions. Otherwise (e.g., the Network_Control bit is set to "0"), the receiving mobiles are alerted that no additional control instructions will follow and can continue to use their own control protocols. These additional instructions can be provided in an additional system information message, such as, for example: Network_Control_Order(Cell_Re-selection_Order, Reporting_Period, . . . etc.).

A "Cell_Re-selection_Order" information item, which is preferably one bit long, can be set to "0" or "1". If this bit is "0", then the receiving mobiles are required to accept cell identity information from the network for immediate cell re-selection. In this case, the receiving mobile terminals can send measurement reports to the network, in accordance with other additional information provided in the control message. Each receiving mobile terminal can continue to use its normal cell re-selection protocol, until it receives new cell identity information from the network. The mobile then selects the new cell.

On the other hand, if the Cell_Re-selection_Order bit is set to "1", then the receiving mobiles can suspend their own cell re-selection calculations, and accept new cell identity information for cell re-selection, from the network. In this case, each mobile terminal sends measurement reports to the network, in accordance with information requests provided in the control message. Each receiving mobile terminal performs no cell re-selection evaluations on its own, but selects the next cell based on the cell identity information received from the network. The Cell_Reselection_Order bit can also be "0", if the network intends the mobiles to send measurement reports only. In that case, the network can refrain from sending cell identity information or power level order information to the mobile terminals involved.

The Network_Control message sent from the network can also contain a "Reporting_Period" information item. As an example, the Reporting_Period item can be three bits long. The binary content of the Reporting_Period field can be coded, for example, proportionally from 0.48 seconds (binary 0) to 3.84 seconds (binary 7), or as a geometrical series from 0.24 seconds (binary 0) to 30.72 seconds (binary 7), or as any other appropriate code.

In the preferred embodiment, the network's control will be maintained as long as a Network_Control bit is broadcast with the value "1". The Network_Control bit can be reset to "0" manually with a Operation & Maintenance (O&M) message to the base station controller (BSC) if, for example, the system operator determines that network control is no longer necessary or desired. This bit can also be reset to "0" automatically by a device in the network. When the Network_Control bit is broadcast with the value "0", the mobile terminals immediately resume control.

The measurement reports sent from the mobile terminals to the network are addressed to the appropriate network entity (e.g., a BSC in GSM). These measurement reports can include the following exemplary information: rxlev (received signal strength) and a quality measure for the cell currently serving the mobile; number of valid neighbor cells; rxlev and broadcast carrier frequency for up to a defined number of valid neighbors; absolute output power (of the mobile's transmitter) and amount of timing advance used; and additional neighbor signal strength measurements. The quality measures sent to the network can include: an interference level measured as a function of signal strength for unused time slots; a Bit Error Rate (BER) measurement obtained from downlink signalling related to a packet transfer; and a BER measure obtained from paging messages sent on the broadcast channel.

The cell identity information that the receiving mobiles are required to accept can include, for example, a Cell Global Identity (CGI), and a "deterrent" value that is meant to inhibit mobile terminals from re-selecting the original cells (e.g., if the Cell_Re-selection_Order bit is set to "0"). Preferably, for the GPRS, the cell identity information is sent from the network to individual mobile terminals in a packet transmission over the PDTCH.

An exemplary application for the present invention is to collect performance statistics for use by the network. For example, in the GPRS, by ordering the packet switched mobile terminals to send measurement reports to the network, an operator can collect performance statistics about downlink conditions throughout the network. These downlink measurements can be used for numerous other applications, such as network tuning, fault localization, trouble shooting, positioning services, and automatic or semi-automatic frequency allocation. For these measurement reporting applications, the reporting periods selected can be relatively long. Consequently, the load on the packet channel can be maintained continuously and thereby kept under control, even for those systems that carry a relatively high amount of packet data traffic.

Figure 3:
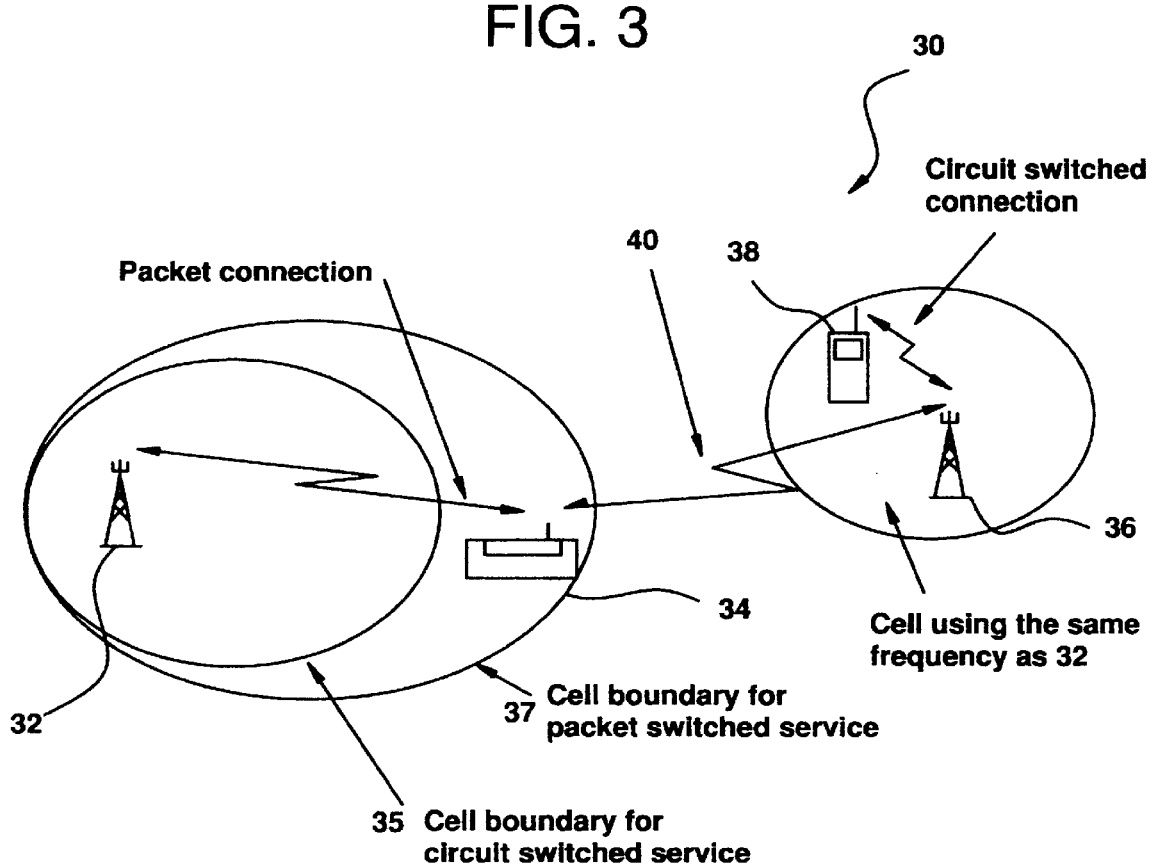
FIG. 3 is a simplified schematic drawing that illustrates an application for the present invention.

FIG. 3 is a simplified schematic drawing that illustrates an application for the present invention. If a packet switched service is introduced to an existing circuit switched system (e.g., GPRS added to GSM), and the packet switched system has to operate with the same carrier frequencies as the circuit switched system, having the packet switched system use virtually the same radio network control logic as the circuit switched system ensures that radio interference between the two systems will be minimized. Otherwise, the signal quality and capacity of the circuit switched system would be degraded by the new packet switched traffic, and the quality of the packet switched service would be low.

For example, referring to the illustrative example in FIG. 3, a mobile communications system 30 includes a base station/transceiver unit 32 that transmits and receives both circuit switched data and packet switched data. A mobile terminal 34 is configured to send and receive packet switched data to or from base station/transceiver unit 32. Terminal 34 can represent one or more of a plurality of packet switched mobile terminals. System 30 also includes a second base station/transceiver unit 36, which transmits and receives circuit switched data. A mobile terminal 38 is configured to transmit and receive circuit switched data to or from base station/transceiver unit 36. As shown, transceivers 32 and 36 are sharing radio network carrier frequencies. The dashed arrow denoted by the number "40" indicates co-channel interference that would have existed between the circuit switched system and packet switched system, but for the use of centralized radio network control in accordance with the present invention. In other words, the co-channel interference (40) is minimized by having the circuit switched and packet switched systems use the same radio network control logic (or at least virtually the same logic), thus causing the cell borders 35 and 37 to coincide rather than being different as shown in FIG. 3.

Figure 4:
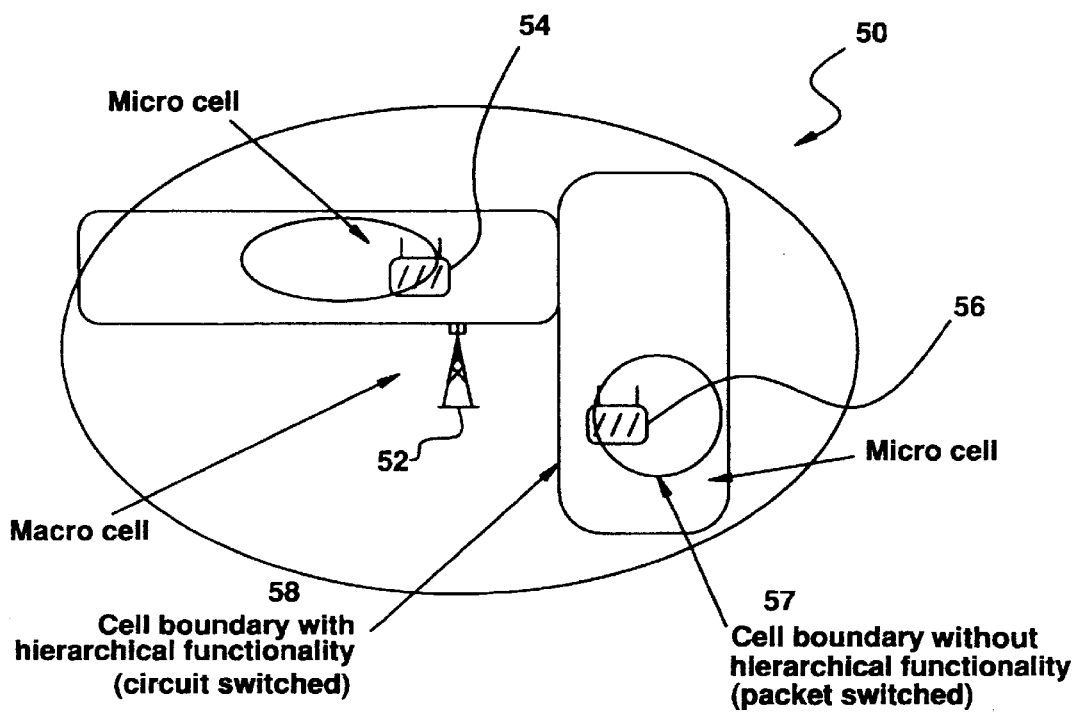
FIG. 4 is a simplified schematic drawing that illustrates a second application for the present invention.

FIG. 4 is a simplified schematic drawing that illustrates another application for the present invention. In the near future, so-called "micro-cells" will be used for dispatch services, an important type of packet data service. In such a micro-cell environment, the desired cell boundaries cannot always be provided by the "best server" corresponding to the highest downlink signal strength received by a mobile station. The concept of "hierarchical functionality" has been used for handling cell selection in such layered cell structures. One approach that has been used is to attempt to connect mobiles to a cell in a "lower layer" of a hierarchy of layers, even if the "lower layer" cell is not defined by the "best server", thereby making use of the traffic capacity available in the "lower layer".

Referring now to FIG. 4, a mobile communications system 50 includes a base station/transceiver unit 52 that transmits and receives energy in a pattern that defines a so-called "macro-cell". A second transceiver unit 54 transmits and receives energy that defines a micro-cell. A third transceiver unit 56 transmits and receives energy that defines a second micro-cell. Transceiver unit 56 carries packet switched and circuit switched traffic. A hierarchical functionality scheme is used to define the micro-cells shown, for the circuit switched traffic. Assuming that the circuit switched system and packet switched system shown in FIG. 4 share radio network carrier frequencies within the same geographical area, if the packet switched system does not support the use of hierarchical functionality but the circuit switched system does, then in accordance with the present invention, the network manager in system 50 can direct the packet switched system to use the same control logic as the circuit switched system (thus causing, for example, the cell boundary 57 to be replaced by the cell boundary 58 for the packet switched traffic). This action will ensure that both the circuit switched and packet switched systems will both have an adequate quality of service and refrain from causing interference with each other, as explained in the previous exemplary application.

Figure 5:
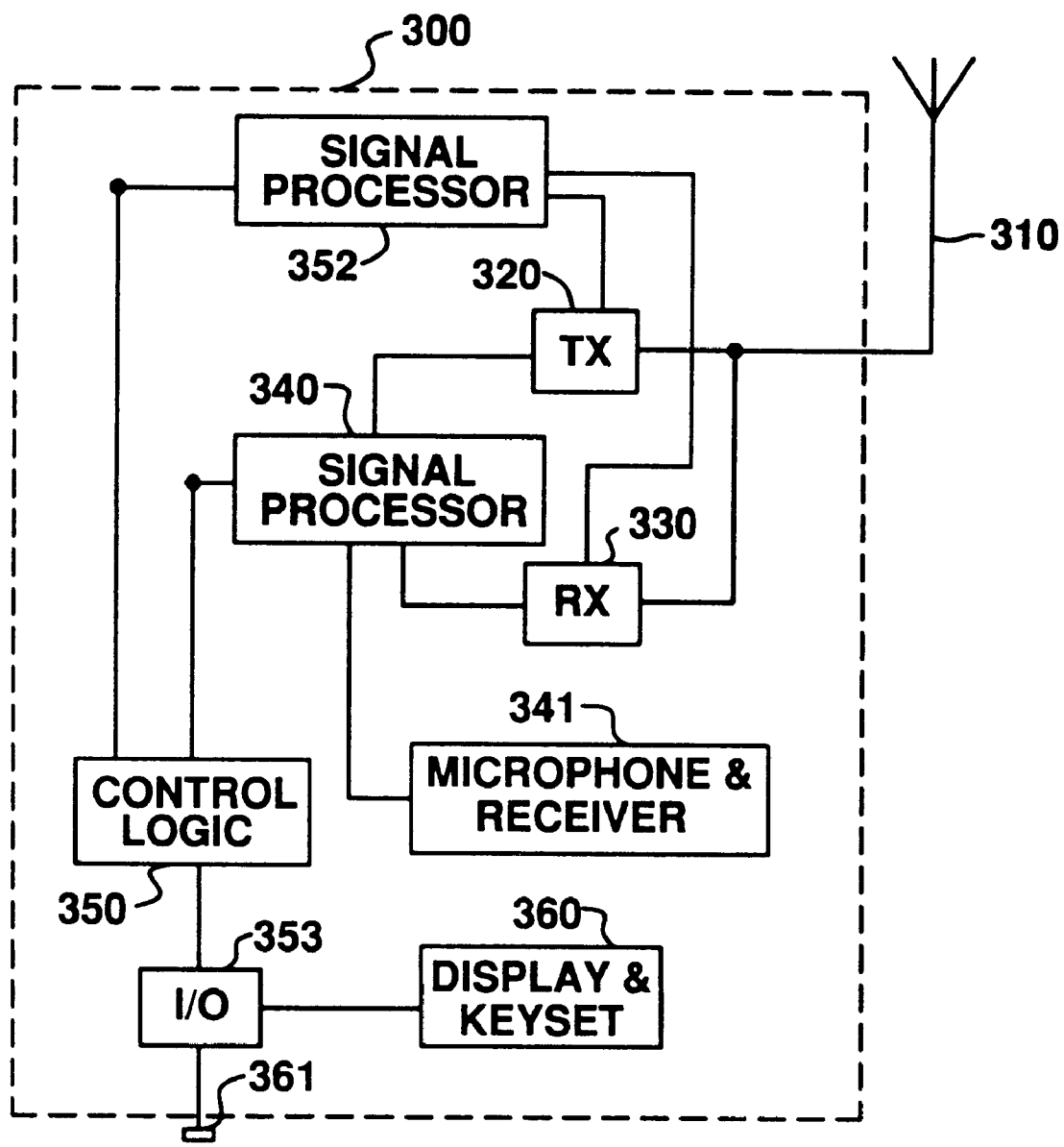
FIG. 5 is a schematic block diagram that illustrates a mobile radio terminal that can be used to implement the preferred embodiment of the present invention.

FIG. 5 is a schematic block diagram that illustrates a mobile radio terminal that can be used to implement the preferred embodiment of the present invention. The mobile radio terminal 300 includes a transmitting/receiving antenna 310. A transmitter section 320 (including modulation and equalization equipment) is connected to antenna 310 and also to a first signal processor unit 340. First signal processor unit 340 operates to control outgoing (transmitted) circuit switched call-related functions. Transmitter section 320 is also connected to a second signal processor unit 352, which operates to control outgoing messages related to packet switched functions (e.g., GPRS messages).

Similarly, mobile radio terminal 300 includes a receiver section 330 (including demodulation and equalization equipment), which is also connected to antenna 310, and first and second signal processor units 340 and 352, respectively. First signal processor unit 340 operates to control incoming (received) circuit switched call-related functions, and second signal processor unit 352 operates to control incoming messages related to packet switched functions (e.g., incoming GPRS messages).

Additionally, first signal processor unit 340 is capable of channel encoding and decoding, and signal processing of speech signals in both the incoming and outgoing directions. First signal processor unit 340 is also connected to a microphone and telephone receiver 341, and a control logic unit 350. Second signal processor unit 352 is also connected to control logic unit 350 and is capable of channel coding and decoding, and signal processing of packet switched (e.g., GPRS) messages in both the incoming and outgoing directions.

The primary reason for using separate signal processor units (340, 352) for speech and packet switched services (e.g., GPRS), respectively, is that the protocols for these two applications differ considerably. Also, from a manufacturing and cost standpoint, it is advantageous to produce only one type of circuit board for speech-only mobile radios and for radio terminals additionally equipped for packet switched services (e.g., GPRS). As such, the speech-only capable mobile radio terminals simply would not be provided with the additional components needed for the packet switched capable mobile radio terminals. Additionally, as an alternate embodiment of the present invention, it is possible to combine signal processor units 340 and 352 into a single more powerful signal processor, which, for example, could be substituted for signal processor unit 340 and thereby eliminate signal processor unit 352 in FIG. 5.

Control logic unit 350 functions, among other things, to provide a higher level of control to signal processor units 340 and 352. The algorithms for controlling cell reselection for GPRS traffic, for example, are implemented in control logic unit 350. In fact, the term "cell reselection" is associated with the GPRS and corresponds to the term "handover" associated with circuit switched GSM services.

In operation, when controlled by an algorithm implemented at the network side, both handover and cell reselection operations send measurement reports on the uplink, and orders on the downlink. For example, the GPRS uplink control messages (e.g., measurement reports from control logic unit 350 to the network) are coupled from control logic unit 350 through second signal processor unit 352 and to transmitter unit 320 and antenna 310. The GPRS downlink control messages (e.g., cell reselection information from the network to control logic unit 350) are coupled from antenna 310 through receiver unit 330 and to second signal processor unit 352 and control logic unit 350. For this exemplary embodiment, the control message and measurement report message formats can be based on the standard GPRS protocol. Moreover, although GPRS communications use a protocol that is different than a speech protocol, the present invention can be readily implemented based on the description provided above for a combined speech capable and packet switched service capable (e.g., GPRS) mobile radio terminal, and the description provided in the GSM Technical Specification (presently GSM 01.60, 02.60, 03.60, 04.60) for the General Packet Radio Service (GPRS) published by the European Telecommunications Standards Institute (ETSI).

The control logic unit 350 is also connected to an input/output (I/O) control unit 353, which adapts the signals towards the interface between the keyset and display unit 360. Additionally, the I/O control unit 353 connects to a plug 361, which allows connection to a personal computer or PC (not explicitly shown). Preferably, for this embodiment, the PC is a laptop that can be used for sending and receiving GPRS messages.

Although a preferred embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for minimizing radio signal interference between a first plurality of mobile terminals and a second plurality of mobile terminals in a mobile communications system, comprising the steps of:
   broadcasting an alert message from a fixed network in said mobile communications system, said alert message indicating for at least one terminal of said first and second plurality of mobile terminals that a radio control message will follow;
   transmitting said radio control message from said fixed network; and
   responsive to a receipt of said radio control message, said at least one terminal of said first and second plurality of mobile terminals relinquishing radio control to said fixed network for radio traffic therebetween, wherein an operator has an option of determining which of the fixed network and the at least one terminal exercises the radio control.

2. The method of claim 1, wherein said at least one terminal of said first and second plurality of mobile terminals transmits and receives packet data.

3. The method of claim 1, wherein said alert message comprises a network control order.

4. The method of claim 1, wherein said alert message comprises a control flag.

5. The method of claim 1, further comprising the step of broadcasting a second alert message from said fixed network in said mobile communications system, said alert message indicating for at least one terminal of said first and second plurality of mobile terminals that no radio control message will follow.

6. The method of claim 1, wherein said radio control message comprises an order to transmit a measurement report.

7. The method of claim 1, wherein said radio control message comprises a first order to accept cell identity information from said fixed network for a subsequent cell reselection.

8. The method of claim 7, wherein said radio control message comprises a second order to terminate said first order to accept cell identity information from said fixed network for a subsequent cell reselection.

9. The method of claim 1, wherein said radio control message comprises a power level order.

10. The method of claim 1, wherein said at least one of said first and second plurality of mobile terminals comprises a plurality of GPRS mobile terminals.

11. The method of claim 1, wherein at least one of said first and second plurality of mobile terminals comprises a plurality of GSM mobile terminals.

12. A method for minimizing radio signal interference between a plurality of packet switched mobile terminals and a plurality of circuit switched mobile terminals in a cellular communications system, comprising the steps of:
   transmitting a control message from a fixed network in said cellular communications system;
   receiving said control message at said plurality of packet switched mobile terminals which are actively listening; and
   responsive to said control message, said plurality of packet switched mobile terminals relinquishing radio control to said fixed network for radio traffic therebetween, wherein an operator has an option of determining which of the fixed network and the plurality of packet switched mobile terminals exercises the radio control.

13. The method of claim 12, wherein said fixed network utilizes a radio network control logic for communicating with said plurality of packet switched mobile terminals which is substantially similar to a radio network control logic said network utilizes for communicating with said plurality of circuit switched mobile terminals.

14. The method of claim 12, wherein said control message comprises a packet data transmission.

15. The method of claim 12, wherein said control message comprises a cell re-selection order.

16. The method of claim 12, wherein said control message comprises a power control order.

17. The method of claim 12, wherein said control message comprises an order for a mobile terminal to transmit a measurement report.

18. A method for minimizing radio signal interference between a plurality of packet switched mobile terminals and a plurality of circuit switched mobile terminals in a cellular communications system, comprising the steps of:

transmitting a control message from a fixed network in said cellular communications system;

receiving said control message by at least one terminal of said plurality of packet switched mobile terminals which are actively listening; and responsive to said control message, said at least one terminal of said plurality of packet switched mobile terminals relinquishing radio control to said fixed network for radio traffic therebetween, wherein an operator has an option of determining which of the fixed network and the at least one terminal of said plurality of packet switched mobile terminals exercises the radio control.

19. The method of claim 18, wherein said fixed network utilizes a radio network control logic for communicating with said at least one terminal of said plurality of packet switched mobile terminals which is substantially similar to a radio network control logic said network utilizes for communicating with said plurality of circuit switched mobile terminals.

20. The method of claim 18, wherein said control message comprises a packet data transmission.

21. The method of claim 18, wherein said control message comprises a cell re-selection order.

22. The method of claim 18, wherein said control message comprises an order for a mobile terminal to transmit a measurement report.

23. The method of claim 18, wherein said control message comprises an order for said at least one terminal to transmit a measurement report.

24. The method of claim 18, wherein said control message comprises a power control order.

25. A multi-service mobile communications system, comprising:

a fixed network means for transmitting and receiving over a radio network at least a first type and second type of service traffic;

a first plurality of mobile terminals for transmitting and receiving over said radio network said first type of service traffic;

a second plurality of mobile terminals for transmitting and receiving over said radio network said second type of service traffic;

first radio network control means associated with said fixed network, for fixed network control of said transmitting and receiving over said radio network said first type of service traffic;

second radio network control means associated with said second plurality of mobile terminals, for mobile terminal control of said transmitting and receiving over said radio network said second type of service traffic; and network control means associated with said fixed network, for converting said mobile terminal control of said second type of service traffic to said fixed network control, wherein said mobile communications system has an option of determining which of the mobile terminal control and the fixed network control exercises control of said transmitting and receiving of said second type of service traffic.

26. The multi-service mobile communications system of claim 25, wherein said network control means associated with said fixed network is further for converting said fixed network control back to said mobile terminal control.

27. The multi-service mobile communications system of claim 25, wherein said first type of service traffic comprises circuit switched traffic.

28. The multi-service mobile communications system of claim 25, wherein said second type of service traffic comprises packet switched traffic.

29. The multi-service mobile communications system of claim 25, wherein said first plurality of mobile terminals comprises a plurality of GSM mobile terminals.

30. The multi-service mobile communications system of claim 25, wherein said second plurality of mobile terminals comprises a plurality of GPRS mobile terminals.

31. The multi-service mobile communications system of claim 25, further comprising a third plurality of mobile terminals for transmitting and receiving over said radio network at least one type of said first type of service traffic and said second type of service traffic.

32. The multi-service mobile communications system of claim 31, wherein each mobile terminal of said third plurality of mobile terminals comprises a combined service mobile terminal.

33. The multi-service mobile communications system of claim 31, wherein each mobile terminal of said third plurality of mobile terminals includes a first signal processor means for processing circuit switched traffic and a second signal processor means for processing packet switched traffic.

34. The multi-service mobile communications system of claim 33, wherein said each mobile terminal of said third plurality of mobile terminals includes means for selectively processing at least one of said circuit switched traffic and said packet switched traffic.

35. A mobile radio terminal for use in a multi-service mobile communications system, comprising:

a transmitter section;

a receiver section;

signal processor means coupled to said transmitter section and said receiver section, for processing at least one type of service traffic in said multi-service mobile communications system; and control means for selecting one of a network control algorithm and a mobile terminal control algorithm responsive to an order from a network associated with said multi-service mobile communications system.

36. The mobile radio terminal of claim 35, wherein said at least one type of service traffic comprises circuit switched traffic.

37. The mobile radio terminal of 35, wherein said at least one type of service traffic comprises packet switched traffic.

* * * * *

UNITED STATES PATENT AND TRADEMARK OFFICE
CERTIFICATE OF CORRECTION

PATENT NO.    : 5,930,241
DATED         : Jul. 27, 1999
INVENTOR(S) : Fried

It is certified that error appears in the above-identified patent and that said Letters Patent is hereby corrected as shown below:

Column 12, line 55    After "system"
Insert --, wherein an operator has an option of determining which of the network control algorithm and the mobile terminal control algorithm exercises control of radio traffic between the mobile radio terminal and a fixed network of the mobile communications system--

Signed and Sealed this

Eighth Day of February, 2000

Attest:

Q. TODD DICKINSON

Attesting Officer

Commissioner of Patents and Trademarks